United States Patent
De Nichilo et al.

(10) Patent No.: US 9,914,382 B2
(45) Date of Patent: Mar. 13, 2018

(54) SEAT ASSEMBLY HAVING STRUCTURAL FOAM WITH INTERGRATED FRAME SUPPORT AND METHOD OF MAKING THE SAME

(71) Applicant: LEAR CORPORATION, Southfield, MI (US)

(72) Inventors: Giovanni De Nichilo, Grugliasco (IT); Angelo Falchero, Turin (IT)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/087,666

(22) Filed: Mar. 31, 2016

(65) Prior Publication Data

US 2017/0232877 A1 Aug. 17, 2017

Related U.S. Application Data

(60) Provisional application No. 62/295,785, filed on Feb. 16, 2016.

(51) Int. Cl.
*A47C 7/18* (2006.01)
*A47C 7/26* (2006.01)
*B60N 2/72* (2006.01)
*B60N 2/68* (2006.01)
*B60N 2/70* (2006.01)
*B60N 2/64* (2006.01)

(52) U.S. Cl.
CPC .............. *B60N 2/72* (2013.01); *B60N 2/646* (2013.01); *B60N 2/68* (2013.01); *B60N 2/682* (2013.01); *B60N 2/70* (2013.01); *B60N 2/7017* (2013.01)

(58) Field of Classification Search
CPC .......... B60N 2/72; B60N 2/60; B60N 2/6009; B60N 2/6018; B60N 2/6027
USPC ......... 297/218.1, 218.2, 218.3, 218.4, 218.5, 297/440.22, 452.18, 452.48, 452.52, 297/452.53
See application file for complete search history.

(56) References Cited

U.S. PATENT DOCUMENTS

| | | | | |
|---|---|---|---|---|
| 3,656,807 | A * | 4/1972 | Arida | B60N 2/72 297/452.26 |
| 3,669,498 | A * | 6/1972 | Meyers | B60N 2/72 297/452.53 |
| 3,915,493 | A * | 10/1975 | Brown | B60N 2/0155 297/440.22 X |
| 4,583,781 | A * | 4/1986 | Hatsutta | B60N 2/1839 297/284.11 |
| 4,583,782 | A * | 4/1986 | Mikuniya | B60N 2/015 297/440.22 X |
| 5,400,490 | A | 3/1995 | Burchi | |
| 5,636,901 | A * | 6/1997 | Grilliot | B60N 2/015 297/452.18 X |

(Continued)

*Primary Examiner* — Rodney B White
(74) *Attorney, Agent, or Firm* — Brooks Kushman P.C.

(57) ABSTRACT

A vehicle seat assembly comprises a seat bottom comprising a frame assembly securable to a vehicle. The frame assembly comprises a frame disposed within a structural foam pad, with the frame assembly having a first attachment member. The vehicle seat assembly comprises a cushion assembly comprising a flexible foam pad supported on a wire frame assembly, with the cushion assembly having second attachment member cooperable with the first attachment member to secure the cushion assembly to the frame assembly. The vehicle seat assembly comprises a seatback secured to the seat bottom.

20 Claims, 3 Drawing Sheets

(56) References Cited

U.S. PATENT DOCUMENTS

| | | | |
|---|---|---|---|
| 5,786,394 A | 7/1998 | Slaven | |
| 5,868,472 A * | 2/1999 | Grilliot | B60N 2/015 |
| | | | 297/452.18 X |
| 5,882,073 A * | 3/1999 | Burchi | B29C 44/1257 |
| | | | 297/218.2 |
| 5,947,562 A * | 9/1999 | Christofferson | A61G 5/10 |
| | | | 297/440.22 X |
| 5,989,699 A | 11/1999 | Kuczynski et al. | |
| 7,008,013 B2 * | 3/2006 | Okamoto | B60N 3/102 |
| | | | 297/188.11 |
| 7,255,383 B2 * | 8/2007 | Iwata | B60N 2/12 |
| | | | 292/216 |
| 7,585,030 B2 | 9/2009 | Galbreath et al. | |
| 7,874,607 B2 | 1/2011 | Weiss et al. | |
| 8,172,318 B2 * | 5/2012 | Kruger | B60N 2/4221 |
| | | | 297/452.18 X |
| 8,308,235 B2 * | 11/2012 | Ellison | B60N 2/7005 |
| | | | 297/452.26 X |
| 8,398,166 B2 * | 3/2013 | Lindsay | B29C 44/0461 |
| | | | 297/452.27 X |
| 8,408,655 B2 * | 4/2013 | Ellison | B60N 2/015 |
| | | | 297/452.18 X |
| 8,439,440 B2 * | 5/2013 | Ellison | B29C 44/0461 |
| | | | 297/452.18 X |
| 8,540,318 B2 * | 9/2013 | Folkert | B60N 2/686 |
| | | | 297/452.18 X |
| 8,690,240 B2 * | 4/2014 | Takakura | B60N 2/5816 |
| | | | 297/218.1 |
| 8,696,067 B2 | 4/2014 | Galbreath et al. | |
| 9,085,246 B1 * | 7/2015 | Pywell | B60N 2/1615 |
| 9,150,120 B2 * | 10/2015 | Antoine | B60N 2/6027 |
| 9,555,728 B2 * | 1/2017 | Galbreath | A01K 1/0272 |
| 2008/0012380 A1 * | 1/2008 | Takahana | B60N 2/0155 |
| | | | 296/65.03 |
| 2008/0191539 A1 * | 8/2008 | Teufel | B60N 2/2245 |
| | | | 297/452.18 |
| 2009/0066142 A1 | 3/2009 | Ventura et al. | |
| 2009/0146472 A1 * | 6/2009 | Galbreath | B60N 2/2887 |
| | | | 297/452.48 X |
| 2009/0295215 A1 | 12/2009 | Galbreath et al. | |
| 2010/0156163 A1 * | 6/2010 | Daisuke | B60N 2/4613 |
| | | | 297/452.18 X |
| 2011/0049948 A1 * | 3/2011 | Hobl | B60N 2/5825 |
| | | | 297/218.2 |
| 2012/0187739 A1 | 7/2012 | Folkert et al. | |
| 2013/0093229 A1 | 4/2013 | Siebold | |
| 2015/0343930 A1 * | 12/2015 | Yokoyama | B60N 2/68 |
| | | | 297/452.18 X |

* cited by examiner

SEAT ASSEMBLY HAVING STRUCTURAL FOAM WITH INTERGRATED FRAME SUPPORT AND METHOD OF MAKING THE SAME

CROSS-REFERENCE TO RELATED APPLICATIONS

This application claims the benefit of U.S. provisional application Ser. No. 62/295,785 filed Feb. 16, 2016, the disclosure of which is incorporated in its entirety by reference herein.

TECHNICAL FIELD

The present disclosure relates to a vehicle seat assembly having a seat bottom assembly securable to a vehicle floor and comprising a seat bottom base assembly cooperable with a seat top assembly and a method of making the same. More specifically, the present disclosure relates to a vehicle seat assembly having a seat bottom assembly having a seat base having a frame structure and structural foam having an attachment structure and a seat top assembly having foam, trim and a frame assembly securable to the attachment structure.

BACKGROUND

Automobile manufacturers and suppliers constantly strive to improve the aesthetic appeal of vehicle interior components. Such considerations have influenced the design of vehicle interior trim, seat, and console components to name a few.

Generally speaking, a vehicle seat assembly includes three fundamental components: a frame to support the seat assembly and to mount it to a vehicle; a foam cushion to cover the frame; and trim material to cover the foam cushion and provide a durable surface for contact with a vehicle occupant. Assembly of the components and the space constraints of the vehicle compartment are always factors that are taking into consideration into vehicle seating design.

Accordingly, there is a continuing need to provide a vehicle seat assembly that can be manufactured easily and relatively economically and that takes up a minimal amount of space.

SUMMARY

According to at least one aspect of the present disclosure, a vehicle seat assembly is provided. In at least one embodiment, the vehicle seat comprises a seat bottom comprising a frame assembly securable to a vehicle. The frame assembly comprises a frame disposed within a structural foam pad, with the frame assembly having a first attachment member. The vehicle seat assembly comprises a cushion assembly comprising a flexible foam pad supported on a wire frame assembly, with the cushion assembly having second attachment member cooperable with the first attachment member to secure the cushion assembly to the frame assembly. The vehicle seat assembly comprises a seatback secured to the seat bottom.

DETAILED DESCRIPTION OF THE PREFERRED EMBODIMENTS

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Reference will now be made in detail to presently preferred compositions, embodiments and methods of the present disclosure, which constitute the best modes of practicing the disclosure presently known to the inventors. The Figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the disclosure.

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
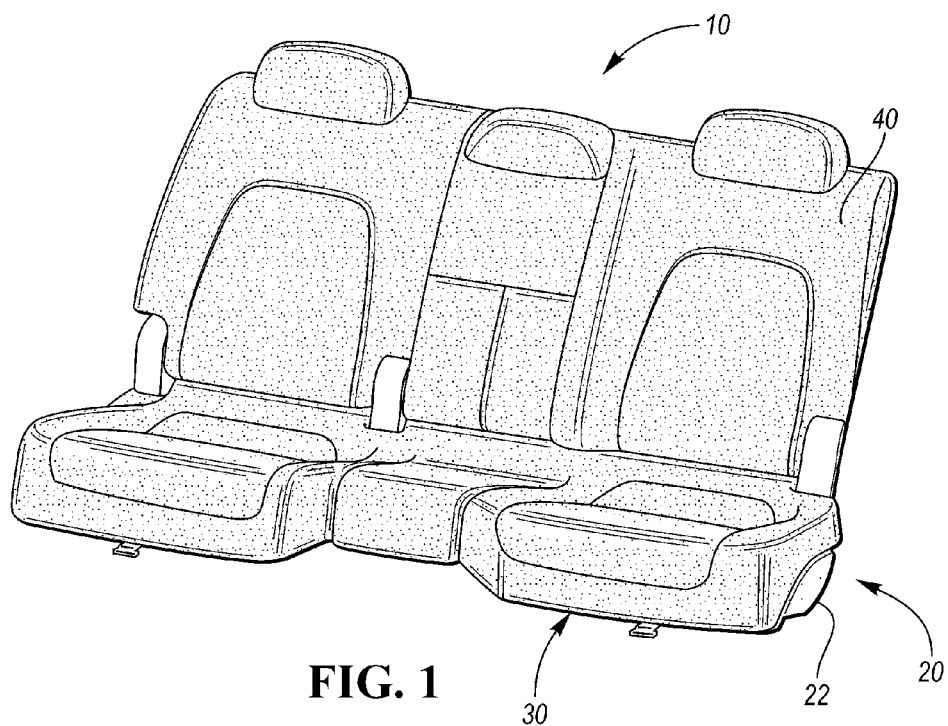
FIG. 1 is a perspective view of a vehicle seat assembly in accordance with an embodiment of the present disclosure.

Referring now to the figures, where like numerals are used to designate like structure throughout to the drawings, a schematic vehicle seat assembly in accordance with at least one embodiment of the present invention is generally shown at 10 in FIG. 1. While the vehicle seat assembly 10 is illustrated in FIG. 1 to be a bench seat assembly, it should be understood that the principles of the present invention are applicable to other types of seat assemblies, such as bucket, captain, and other types of seat assemblies. Also, while the present disclosure will be described in connection with a seat bottom, it should also be understood that the principles of the present invention are applicable to other applications where foam is a component such as backrests, back support pads, armrests, and head restraints.

In an embodiment of the present disclosure, the seat assembly is a rear vehicle seat 10 having a layered cushion system. Referring to the figures, in at least the illustrated embodiment, the rear seat 10 comprising a seat bottom 20 comprising i) a seat bottom frame assembly 22 comprising a EPP, or other structural foam, pad 24 molded onto a frame 26, and ii) and a seat bottom cushion assembly 30 comprising a trimmed cushion pad 34 molded onto an integrated metal wire 36, with the trimmed cushion assembly 30 being operatively secured to the seat bottom frame assembly 22. The seat bottom frame assembly 22 is provided with a plurality of mounting brackets (not shown in FIG. 1) adapted to operatively secure the seat frame assembly 22 to a vehicle floor.

The seat bottom 20 is usable with any type of seatback 40 to form the vehicle seat 10. In certain embodiments, the seatback 40 and seat bottom 20 are made of the same construction. However, it should be understood that the construction of the seatback 40 can differ from the construction of the seat bottom 20.

Figure 2:
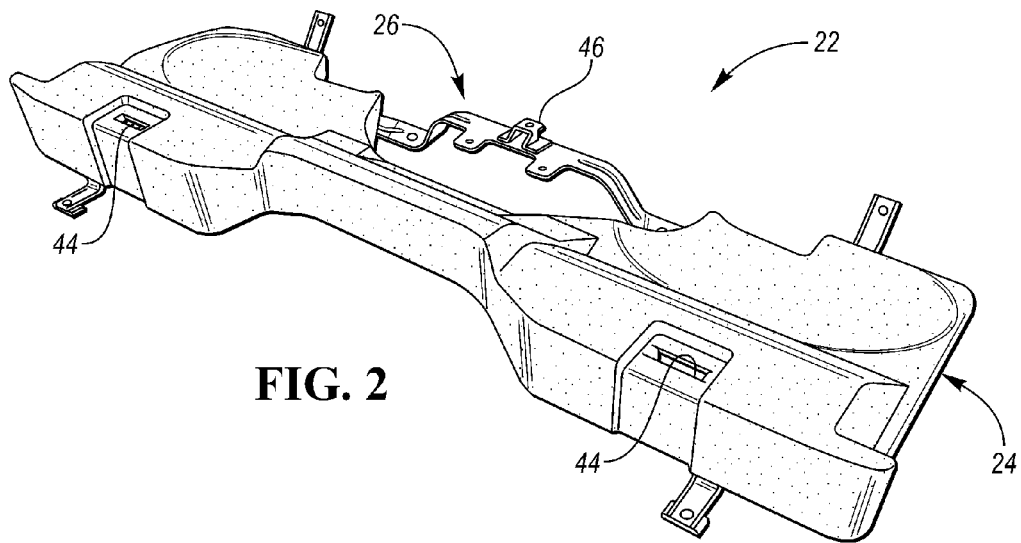
FIG. 2 is a perspective view of an embodiment of a seat bottom assembly useable with the vehicle seat assembly illustrated in FIG. 1.

A representative seat bottom frame assembly 22 is illustrated in FIG. 2. In the illustrated embodiment, the frame assembly 22 comprises a pad 24 made of EPP (expanded polypropylene) or other structural foam over molded, or otherwise secured, to a suitable frame 26. In at least the illustrated embodiment, the frame assembly 22 includes attachment housings 44 to which hooks or other fasteners, such as spring clips, from the trimmed cushion assembly 30 are operatively securable to. While the frame assembly 22 is shown to have two attachment housings 44 disposed at the front upper surface of the structural foam pad 24, the number and location of the attachment housings can vary as desired. For instance, one or more, or all, of the attachment housings 44 could be on the frame 26. Furthermore, one or more, or all, of the attachment housings 44 could be on the trimmed cushion assembly 30.

In addition to the above mentioned attachment housings 44 and hooks or other fasteners, the frame assembly 22 and the trimmed cushion assembly 30 can have a cooperating latch system to help constrain relative movement between the frame assembly 22 and the trimmed cushion assembly 30 in the event of a sudden vehicle stop or deceleration. Towards that end, the frame 26 can also include at least one latch 46, shown in the embodiment illustrated in FIG. 2 in the upper back middle portion of the frame 26. Alternatively, it should be understood that the latch 46 could be disposed on the wire system 36 of the trimmed cushion assembly 30. The latch 46 is cooperable with a hook, or other catch 52, on the wire system 36 to help constrain relative movement between the frame assembly 22 and the trimmed cushion assembly 30 in the event of a sudden vehicle stop or deceleration.

The seat frame 26 may be constructed from any material suitable for application within a vehicle seat assembly 10, such as aluminum, steel or other metal alloy or a suitable polymer. Further, the seat frame 26 may be manufactured using a technique commonly known in the art, relative to the type of material employed. By way of example, manufacturing techniques may include stamping, welding, fastening or molding a suitable material to form a seat frame 22.

Figure 3:
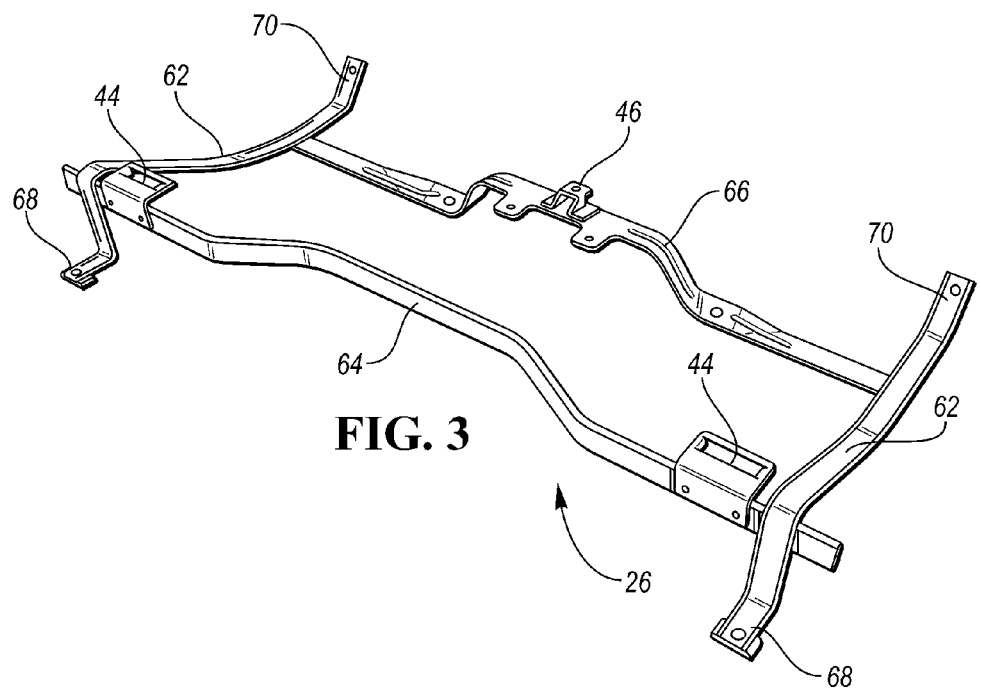
FIG. 3 is a perspective view of a component of the seat bottom assembly of FIG. 2.

A representative seat frame 26 is illustrated in FIG. 3. In the illustrated embodiment, the seat frame 26 has spaced apart side rails 62, a front cross bar 64 and a rear cross bar 66, spaced behind the front cross bar. The cross bars 64 and 66 extend between and connect the side rails 62. The cross bars 64 and 66 can be secured to the side rails 62 by any suitable manner, such as be welding, or could be integrally formed. In at least the illustrated embodiment, the side rails 66 each have front and rear bracket portions 68 and 70, respectively, adapted to operatively secure the seat frame assembly 22 to a vehicle floor. In at least the illustrated embodiment, the front cross bar 64 includes the attachment housings 44 to which hooks or other fasteners from the trimmed cushion assembly 30 are operatively securable to. As can be best seen in FIG. 2, the structural foam pad 24 is molded such that the attachment housings 44 are not covered by the structural foam.

While the structural foam pad 24 can have any suitable size and configuration, in at least one embodiment, the structural foam pad 24 has an average thickness of 5 to 100 mm, in other embodiments of 20 to 70 mm, and in yet other embodiments of 30 to 50 mm. In other embodiments, the structural foam pad 24 has a length of 400 to 1400 mm and a width of 300 to 600 mm, and in yet other embodiments a length of 900 to 1200 mm and a width of 350 to 500 mm. The structural foam pad 24 may be made of any suitable material, such as structural foam. Any suitable structural foam can be employed. In at least one embodiment, suitable structural foams may have a rigidity and/or hardness (i.e., compressive strength) that is higher than conventional high resilience seating cushion polyurethane foam. One suitable structural foam is a relatively stiff, rigid polyurethane foam. Another suitable example is an expanded polymer layer.

In at least one embodiment, a suitable structural foam comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, blends thereof and the like. In at least one embodiment, the EPO is expanded polypropylene (EPP) and its copolymers with ethylene, propylene and butylene.

In at least one embodiment, the structural foam pad 24 is molded over the frame 26 in any suitable manner. In one embodiment, the frame 26 is placed in a mold, with certain parts, such at the bracket portions 68 and 70 and the attachment housings 44 being covered and thus protected from the foam forming materials introduced into the mold to form the structural foam pad 24. Structural foam forming materials are then introduced into the mold to form the frame assembly 22.

Figure 4:
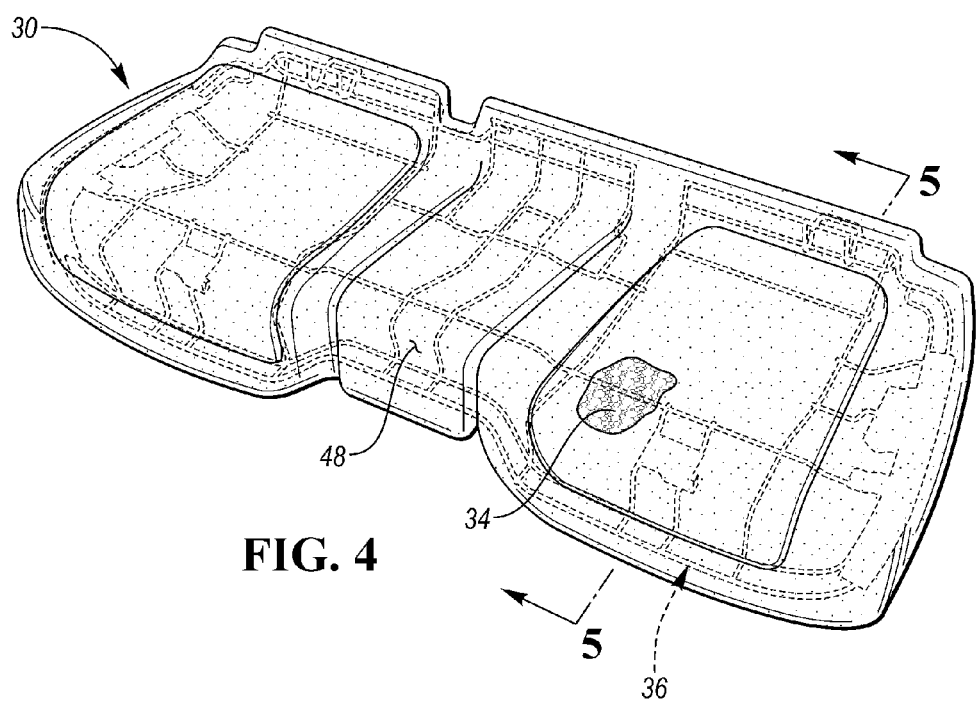
FIG. 4 is a perspective view of an embodiment of a seat top assembly useable with the vehicle seat assembly illustrated in FIG. 1 and cooperable with seat bottom assembly of FIG. 2.
Figure 5:
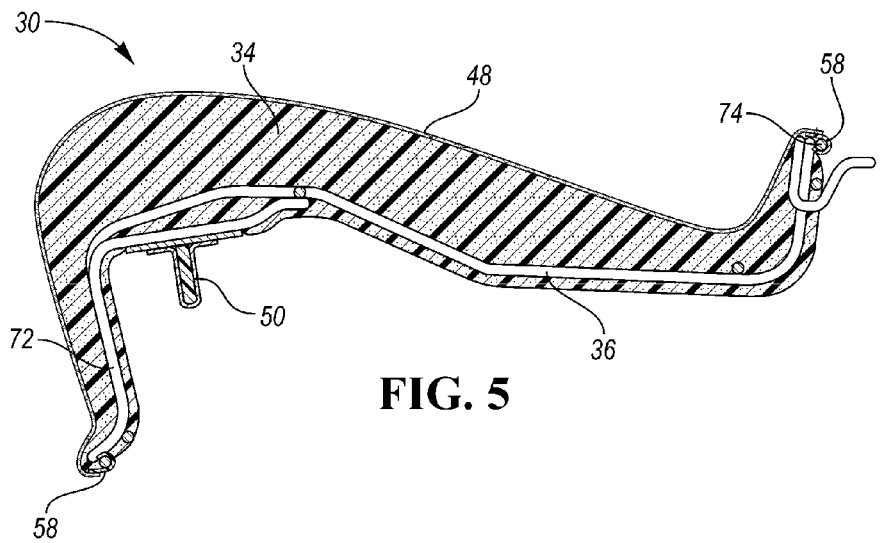
FIG. 5 is a sectional view taken along 5-5 of the seat top assembly of FIG. 4.

A representative trimmed cushion assembly 30 is illustrated in FIGS. 4 and 5. In at least the embodiments illustrated in FIGS. 4 and 5, the trimmed cushion assembly 30 includes a polyurethane or other flexible foam pad 34 over molded, or otherwise secured, to a wire system 36, or other type of cushion frame system. In at least one embodiment, the trimmed cushion assembly 30 has hooks and/or other fasteners that are operatively secured to the attachment housings 44 of the frame assembly 22. In one embodiment, a trim cover 48 is secured to the foam pad 34 and/or wire system 36 prior to securing the cushion assembly 30 to the frame assembly 22. In the embodiment illustrated in FIG. 5, the trim cover 48 is provided with hooks 58, or other suitable fasteners, for operatively securing the trim cover 48 to the front and rear rails 72 and 74 of the wire system 36. In one embodiment the fasteners 58 can be spring clips that cooperate with the housings 44. In an alternate embodiment, the trim cover 48 is secured to the foam pad 34 and/or wire system 36 after the cushion assembly 30 is secured to the frame assembly 22. In at least one embodiment, the trimmed cushion assembly 30 has a front portion that extends over and in front of the front of the frame assembly 22 to provide a finished, trimmed appearance to the seat 10.

Figure 6:
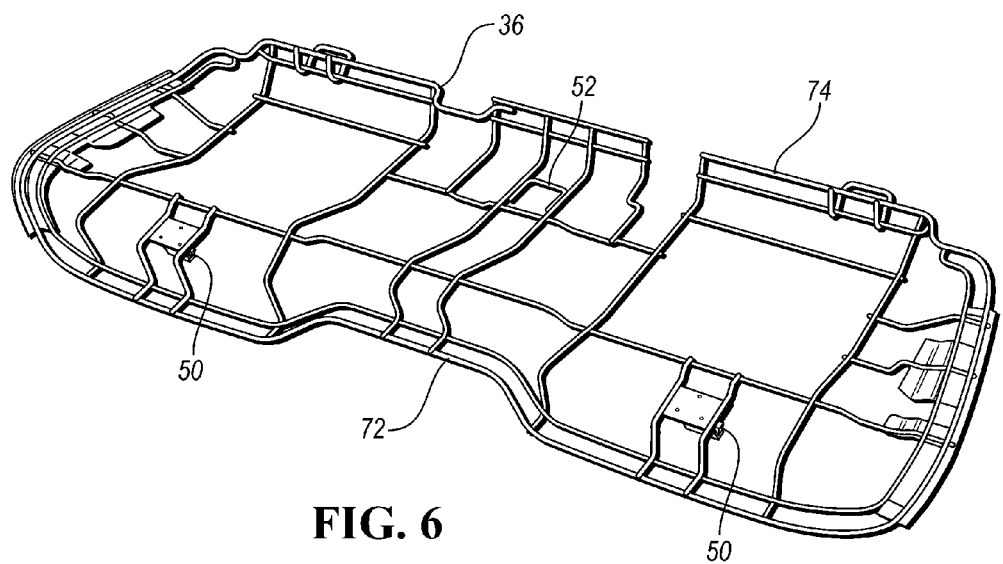
FIG. 6 is a perspective view of a component of the seat top assembly of FIG. 4.

A representative wire system 36 for the trimmed cushion assembly 30 is shown in FIG. 6. In the illustrated embodiment, hooks or other fasteners 50 are disposed on the underside of the wire system 36. The hooks 50 are operatively securable to the frame assembly 22 to form the seat bottom 20. While the wire system 36 is shown to have two hooks 50 disposed at the front underside, the number and location of the hooks 50 can vary as desired. Furthermore, one or more, or all, of the hooks 50 could be on frame assembly 22 with the corresponding attachment housings 44 being on the trimmed cushion assembly 30.

While the flexible foam pad 34 can have any suitable size and configuration, in at least one embodiment, the flexible foam pad 34 has an average thickness of 5 to 100 mm, in other embodiments of 20 to 70 mm, and in yet other embodiments of 30 to 50 mm. In other embodiments, the flexible foam pad 34 has a length of 400 to 1400 mm and a width of 300 to 600 mm, and in yet other embodiments a length of 900 to 1200 mm and a width of 350 to 500 mm. In one embodiment, the flexible foam pad 34 has a shape and size that is similar to the shape and size of the structural foam pad 24. In another embodiment, the flexible foam pad 34 has a shape that his similar to the shape of the structural foam pad 24 but a size that is bigger than the size of the structural foam pad 24 such that the structural foam pad is received within the flexible foam pad.

The flexible foam pad 34 can comprise any suitable cushion material such as a suitable resilient polymer. In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

The foam pad 34 can be formed in any suitable manner. In at least one embodiment, the foam pad 34 is molded over the wire system 36 in any suitable manner. In one embodiment, the wire system 36 is placed in a mold, with certain parts, such as the attachment hooks 50 and 52 being covered and thus protected from the foam forming materials introduced into the mold to form the foam pad 34. Flexible foam forming materials are then introduced into the mold to form the pad 34 over the wire system 36.

The trim cover 48 can be adapted to engage the foam pad 34 and/or the wire system 36 in a covering relationship. The trim cover 48 may include any material commonly known in the art. By way of example, some of the known materials include cloth, leather, or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as trim cover 48 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim cover 48 for increasing strength without increasing rigidity.

In one embodiment, the frame assembly 22 and the trimmed cushion assembly 30 are manufactured separately with the frame assembly 22 being first secured to the vehicle and then the trimmed cushion assembly 30 being secured to the frame assembly. In another embodiment the frame assembly 22 and the trimmed cushion assembly 30 are manufactured separately with the trimmed cushion assembly 30 being first secured to the frame assembly 22 to form the seat bottom 20 and then seat bottom 20 is secured to the vehicle.

In a variation of the embodiments discussed above, the trim cover 48 is secured to the foam pad 34 and/or wire system 36 of the cushion assembly or to the frame assembly 22 after the cushion assembly 30 is secured to the frame assembly 22. In this embodiment, the cushion assembly 30 comprises the flexible foam pad 34 over molded, or otherwise secured, to the wire system 36, but does not include the trim cover 48.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
    a seat bottom comprising:
        a frame assembly securable to a vehicle, the frame assembly comprising a frame disposed within a structural foam pad, the frame assembly having a first attachment member;
        a cushion assembly comprising a flexible foam pad supported on a wire frame assembly, the wire frame assembly having a second attachment member cooperable with the first attachment member to secure the cushion assembly to the frame assembly; and
    a seatback secured to the seat bottom.

2. The vehicle seat assembly of claim 1 wherein the cushion assembly comprises a trim cover covering the flexible foam pad and secured to the wire frame assembly.

3. The vehicle seat assembly of claim 1 wherein the frame assembly has a front and a back and the cushion assembly has a front portion that extends over and in front of in a covering relationship with the front of the frame assembly.

4. The vehicle seat assembly of claim 3 wherein the flexible foam pad has a first size and the structural foam pad has a second size, smaller than the first size, such that the structural foam pad is received within the flexible foam pad.

5. The vehicle seat assembly of claim 1 wherein one of the first and second attachment members is a hook and the other of the first and second attachment members is an attachment housing for receiving the hook to inhibit relative movement between the cushion assembly and the frame assembly.

6. The vehicle seat assembly of claim 5 wherein the wire frame assembly has an upper side and a lower side and the frame has an upper surface and a lower surface, with the second attachment member comprising a plurality of hooks disposed on the lower side of the wire frame assembly, and the first attachment member comprising a plurality of attachment housings each of the attachment housings receiving a respective one of the hooks.

7. The vehicle seat assembly of claim 1 wherein the frame assembly comprises the structural foam pad overmolded to the frame, with the frame having attachment brackets for securing the seat bottom to a vehicle.

8. The vehicle seat assembly of claim 7 wherein the cushion assembly comprises the flexible foam pad overmolded to the wire frame assembly.

9. A vehicle seat bottom securable to a vehicle, the vehicle bottom cooperable with a seatback to form a seat, the seat bottom comprising:
a frame assembly securable to a vehicle, the frame assembly comprising a frame disposed within a structural foam pad, the frame assembly having a first attachment member; and
a cushion assembly comprising a flexible foam pad supported on a wire frame assembly, the wire frame assembly having a second attachment member cooperable with the first attachment member to secure the cushion assembly to the frame assembly.

10. The vehicle seat bottom of claim 9 wherein the cushion assembly comprises a trim cover covering the flexible foam pad and secured to the wire frame assembly.

11. The vehicle seat bottom of claim 9 wherein the frame assembly has a front and a back and the cushion assembly has a front portion that extends over and in front of in a covering relationship with the front of the frame assembly.

12. The vehicle seat bottom of claim 11 wherein the flexible foam pad has a first size and the structural foam pad has a second size, smaller than the first size, such that the structural foam pad is received within the flexible foam pad.

13. The vehicle seat bottom of claim 9 wherein one of the first and second attachment members is a hook and the other of the first and second attachment members is an attachment housing for receiving the hook to inhibit relative movement between the cushion assembly and the frame assembly.

14. The vehicle seat bottom of claim 13 wherein the wire frame assembly has an upper side and a lower side and the frame has an upper surface and a lower surface, with the second attachment member comprising a plurality of hooks disposed on the lower side of the wire frame assembly, and the first attachment member comprising a plurality of attachment housings, each of the attachment housings receiving a respective one of the hooks.

15. The vehicle seat bottom of claim 9 wherein the frame assembly comprises the structural foam pad overmolded to the frame.

16. The vehicle seat bottom of claim 15 wherein the cushion assembly comprises the flexible foam pad overmolded to the wire frame assembly.

17. A method of making a vehicle seat assembly comprising:
providing a frame assembly securable to a vehicle, the frame assembly comprising a frame disposed within a structural foam pad, the frame assembly having a first attachment member; and
providing a cushion assembly comprising a flexible foam pad supported on a wire frame assembly, the wire frame assembly having a second attachment member;
securing the first attachment member to the second attachment member to form a seat bottom; and
securing a seatback to the seat bottom.

18. The method of claim 17 wherein one of the first and second attachment members is a hook and the other of the first and second attachment members is an attachment housing for receiving the hook to inhibit relative movement between the cushion assembly and the frame assembly.

19. The method of claim 17 wherein the frame assembly comprises the structural foam pad overmolded to the frame and the cushion assembly comprises the flexible foam pad overmolded to the wire frame assembly.

20. The method of claim 17 wherein the wire frame assembly has an upper side and a lower side and the frame has an upper surface and a lower surface, with the second attachment member comprising a plurality of hooks disposed on the lower side of the wire frame assembly, and the first attachment member comprising a plurality of attachment housings, each of the attachment housings receiving a respective one of the hooks.

\* \* \* \* \*